(12) United States Patent
Bauer et al.

(10) Patent No.: US 6,818,288 B2
(45) Date of Patent: Nov. 16, 2004

(54) FIBER-REINFORCED CERAMIC COMPOSITES

(75) Inventors: Moritz Bauer, Augsburg (DE); Andreas Kienzle, Thierhaupten (DE); Ingrid Kraetschmer, Biberach (DE); Mario Krupka, Adelsried (DE)

(73) Assignee: SGL Carbon AG (DE)

( * ) Notice: Subject to any disclaimer, the term of this patent is extended or adjusted under 35 U.S.C. 154(b) by 0 days.

(21) Appl. No.: 10/328,414

(22) Filed: Dec. 23, 2002

(65) Prior Publication Data

US 2003/0129375 A1 Jul. 10, 2003

(30) Foreign Application Priority Data

Dec. 31, 2001 (DE) .......................................... 101 64 229

(51) Int. Cl.⁷ ............................................... B32B 18/00
(52) U.S. Cl. ................. 428/293.4; 428/210; 428/293.1; 428/367; 428/372; 428/391; 428/307.7; 427/383.7; 427/229; 427/228; 427/372.2
(58) Field of Search ............................ 427/383.7, 228, 427/229, 383.5, 372.2; 428/114, 172, 209, 210, 220, 293.1, 293.4, 325, 367, 368, 372, 375, 391, 307.7, 317.9, 319.1; 264/103, 325

(56) References Cited

U.S. PATENT DOCUMENTS

| | | | | |
|---|---|---|---|---|
| 4,568,594 A | * | 2/1986 | Hordonneau et al. | .... 427/376.1 |
| 4,613,473 A | * | 9/1986 | Layden et al. | .............. 264/103 |
| 4,822,660 A | * | 4/1989 | Lipp | .......................... 428/113 |
| 4,852,347 A | * | 8/1989 | Reynolds et al. | ............. 60/253 |
| 5,198,281 A | * | 3/1993 | Muzzy et al. | ............... 428/102 |
| 6,042,935 A | * | 3/2000 | Krenkel et al. | .......... 428/307.7 |
| 6,264,045 B1 | * | 7/2001 | Wilson et al. | .............. 210/491 |
| 6,390,304 B1 | * | 5/2002 | Wilson et al. | .............. 210/491 |

FOREIGN PATENT DOCUMENTS

| | | | | |
|---|---|---|---|---|
| DE | 44 38 456 A1 | 5/1996 | ........... F16D/69/02 |
| DE | 197 10 105 A1 | 9/1998 | ........... C04B/35/83 |
| DE | 197 11 829 C1 | 10/1998 | ........... C04B/35/80 |
| DE | 198 56 721 A1 | 6/2000 | ......... C04B/35/577 |
| DE | 199 39 545 A1 | 2/2001 | ........... F16D/69/02 |
| EP | 1 124 071 A1 | 8/2001 | ........... F16D/65/12 |
| EP | 1 124 074 A1 | 8/2001 | ........... F16D/69/02 |
| EP | 1 211 231 A1 | 6/2002 | ......... C04B/35/573 |
| FR | 2 781 852 A1 | 2/2002 | ........... F16D/69/02 |
| WO | WO 99/41069 A1 | 8/1999 | ........... B32B/18/00 |
| WO | WO 00/41982 A1 | 7/2000 | ........... C04B/35/80 |
| WO | WO 02/26659 A1 | 4/2002 | ........... C04B/37/00 |

* cited by examiner

Primary Examiner—Merrick Dixon
(74) Attorney, Agent, or Firm—Connolly Bove Lodge & Hutz LLP

(57) ABSTRACT

Fiber-reinforced ceramic composites which comprise at least two layers of a multidirectional woven fiber fabric as reinforcement, with at least 5% of the area of each layer of woven fiber fabric being permeated by matrix material, friction disks comprising these composites as core zone or support zone, a process for producing them and their use as brake disks or clutch disks.

15 Claims, No Drawings

FIBER-REINFORCED CERAMIC COMPOSITES

FIELD OF THE INVENTION

The invention relates to fiber-reinforced ceramic composites. In particular, the invention relates to clutch disks for motor vehicles and a process for producing friction disks from these composites, where these friction disks comprise the fiber-reinforced ceramic composites, in particular those which are reinforced with carbon fibers, especially woven fabric-reinforced C/SiC core material (carbon fiber-reinforced materials whose matrix comprises silicon carbide) and a ceramic friction layer comprising predominantly SiC phases.

BACKGROUND OF THE INVENTION

The use of mineral fibers for friction linings of clutches has been known for a long time. Asbestos materials are particularly suitable for this purpose. However, the use of these asbestos-containing materials is nowadays no longer acceptable from an ecological point of view, so that use is made virtually exclusively of materials based on other mineral fibers. Owing to the increased power of engines, vehicle speeds and weights of vehicles, the demands made of the tribological properties of clutch disks in the motor vehicle sector have also increased; for this reason, new material pairings are also being examined to an increasing extent.

In this context, carbon fiber-reinforced composites or ceramics, in particular those having an SiC-containing matrix, are of particular interest. These materials have a high thermal stability, low wear and good tribological properties.

In DE-A 199 39 545, clutch disks are described having friction linings made of carbon fiber-reinforced silicon carbide (SiC) to increase the stressability and performance compared to the prior art. A disadvantage here is that production of a dense SiC matrix reinforced with carbon fibers can be achieved only with difficulty on an industrial scale. A technical achievement in material synthesis has been achieved by infiltration of carbon fiber-reinforced carbon-containing intermediate bodies with liquid silicon, generally giving carbon fiber-reinforced composites having an Si and SiC matrix.

In WO-A 00/41982 ceramic bodies are proposed for brake disks which are composed of a core layer and a friction layer, with the core body being made up of at least one long fiber-reinforced layer, preferably with UD layers (layers of unidirectional tapes, i.e. tapes which comprise continuous parallel fibers) arranged at an angle to one another. Between the UD layers, there may be further layers of short fiber-reinforced material or woven fabric-reinforced material. In the case of high rotational speeds as are required, in particular, for clutch disks, it has been found that the UD fiber layers are relatively unsuitable because of the low tensile strength perpendicular to the fiber direction.

Short fiber-reinforced C/SiC variants have proven themselves in respect of oxidation resistance at very high temperatures and during long-term operation, particularly in the case of brake disks. However, the high rates of rotation required for clutch disks cannot be achieved with the short fiber-reinforced C/SiC variants.

In EP-A 1 124 074 and EP-A 1 124 071, brake disks are disclosed composed of C/SiC and production processes for these in which base material reinforced with short fiber bundles is additionally provided with long fibers for reinforcement. The long fibers extend around the contour of the brake disk. This is said to inhibit crack growth and increase the strength of the disk. However, the disks described do not have dedicated SiC-rich friction layers which have been found to be advantageous, in particular for brake and clutch disks which rotate at high speeds.

The production processes from EP-A 1 124 074 and EP-A 1 124 071 are relatively unsuitable for achieving high long fiber contents and a uniform long fiber distribution over the entire component. However, both are prerequisites for a further increase in the strength under rotational stress.

It is therefore an object of the invention to achieve an improvement compared to the prior art in the strength of fiber-reinforced friction bodies, in particular clutch disks, at high rates of rotation or rotational speeds. At the same time, good tribological properties of the friction surfaces and an advantageous oxidation behavior are to be achieved. The clutch disks should be able to be produced by the technically and economically efficient liquid silicization process.

SUMMARY OF THE INVENTION

This object is achieved by the provision of a fiber-reinforced ceramic composite which is reinforced by a plurality of layers of a multidirectional woven fiber fabric, with the individual layers being penetrated by regions of a matrix comprising phases of silicon carbide, metallic silicon and optionally carbon. The clutch disks or friction disks produced from this composite additionally have a composite ceramic friction layer having a mass fraction of SiC in the range from 30 to 99%.

The invention accordingly provides a fiber-reinforced ceramic composite which comprises at least two layers of a multidirectional woven fiber fabric as reinforcement, with at least 5% of the area of each layer of woven fiber fabric, preferably at least 10% and particularly preferably at least 15%, being permeated by matrix material. The matrix material can therefore also form a continuous phase in a direction perpendicular to the plane of the layers of woven fabric.

Here and in the following, the term "layer of woven fiber fabric" or "fiber mat" refers to any flat structure made up of fibers, i.e. the terms include braids, knitted fabrics, and nonwovens.

DETAILED DESCRIPTION OF THE PREFERRED EMBODIMENTS

The fiber mats within a layer ensure a high tensile strength in the plane regardless of the direction and thus make high rotational speeds possible. Surprisingly, it has been found that matrix regions penetrating the area of the fiber mats improve the interlaminar shear strength between two adjacent fiber mats, and thus ensure cohesion of the composite under shear stress or torsional stress as occurs, for example, under frictional loading. Furthermore, the oxidation paths along the oxidation-sensitive carbon fibers are interrupted by the oxidation-insensitive matrix and the progress of oxidative damage to the fibers is stopped.

According to the invention, long fibers having a mean length of at least 50 mm which may be woven, knitted or braided in at least two directions to form a fiber mat are used as reinforcing fibers. Compared to unidirectional fiber tapes, this ensures a significantly higher strength. Likewise, the presence of both radial and tangential reinforcing components in a single layer is ensured in a simple manner.

Preference is given to using carbon-containing fibers, in particular carbon fibers and/or graphite fibers, as reinforcing fibers. The matrix preferably comprises phases of silicon carbide together with phases comprising metallic silicon, if desired alloyed with other metals, and optionally phases comprising elemental carbon and/or carbides of elements other than silicon. Preference is given to the matrix having a proportion by mass of silicon carbide of at least 70%.

A further aspect of the invention is the use of the composite of the invention as support zone for friction elements or friction disks, in particular of clutch disks and brake disks in vehicles.

A further aspect of the invention is the composition of the friction surface or friction layer comprising a composite ceramic having a high proportion of SiC phases which is to be applied to the composite of the invention as core or support zone. The proportion by mass of SiC phases in this friction surface or layer is preferably from 30 to 99%, based on the mass of the friction layer. This improves the wear resistance and the coefficient of friction of the friction surface with undiminished bonding to the support zone of the friction body because of the similar thermal expansion. This strong bond to the composites of the invention is made possible by the continuous matrix of the composites in the direction perpendicular to the layers of woven fiber fabric.

The composite comprising core zone and friction layer of such a friction body is advantageously produced by liquid infiltration of fiber-reinforced or fiber bundle-reinforced carbon-containing intermediate bodies with silicon melts. Such processes are known, for example, from DE-A 198 56 721, DE-C 197 11 829 or DE-A 197 10 105.

According to the invention, the fiber-reinforced ceramic composite has a fiber reinforcement of fiber mats, with the fibers being coated, in particular, with polymers or carbonizable substances and/or their pyrolysis products. As fibers, preference is given to carbon-containing fibers, particularly preferably carbon or graphite fibers, and fibers comprising compounds of at least two of the elements Si, C, B, Ti and N.

The length of the fibers or fiber bundles in the fiber mats is, in the case of use as a friction disk, preferably at least 10% of the diameter of the friction disk.

The fiber mats or the fibers of which they are built up are preferably coated with carbon which is formed by carbonization of polymers, resins or pitches. This produces the "sacrificial carbon" and a protective carbon sheath as fiber protection during the subsequent silicization. During the silicization, this carbon is partly converted into SiC. According to the invention, the fiber protection and the silicization conditions are selected so that at least part of this sacrificial carbon, the fiber protection and the fibers are converted into SiC and residual Si and C. This produces the matrix regions which, according to the invention, intersperse the fiber mat. The individual fiber mats are preferably separated completely from one another by a layer of matrix material.

The size and arrangement of these matrix regions allows three-dimensional penetration of the composite by the phase comprising SiC, Si and C. In contrast to the previously known construction of the core zone from continuous woven fiber mats, prepreg layers, nonwovens and the like, the structure according to the invention has a continuous (matrix) phase comprising SiC, Si and C perpendicular to the plane of the fiber mats. This achieves a high shear strength and torsional strength between adjacent fiber layers. In the case of use as a clutch disk, it is preferred that the area of the fiber mats permeated by matrix regions is at least 20%.

While the oxidation, in particular of the carbon fibers, caused by excessive thermal stress progresses along the fiber bundles into the interior of the composite in the case of the composites of the prior art, further progress of the oxidation is stopped effectively in the case of the composites of the invention by the matrix regions comprising SiC, Si and C.

The friction layer or the friction lining which can be applied to a core or support zone made of the fiber-reinforced ceramic composites of the invention to provide a friction body differs from the composition of the matrix of the composite of the invention in a reduced fiber content or an increased proportion of Si and SiC phases. In particular, the friction layer contains neither woven fabric reinforcement nor long fiber reinforcement. The maximum length of the short fibers in the friction layer is not more than 30 mm. The frictional layer preferably has a composition with a proportion by mass of SiC phases of from 30 to 99%, particularly preferably from 70 to 98%, in particular from 80 to 95%, based on the mass of the friction layer. The proportion by mass of (short) fibers in the friction layer is preferably from 20 to 60%, in particular up to 35%, based on the mass of the friction layer. The thickness of the friction layer is at least 0.1 mm, preferably at least 0.5 mm and particularly preferably at least 1 mm.

The process for producing a friction disk comprising a support zone composed of the composite material of the invention can be divided into the following general steps:

a) production of a prepreg comprising at least two layers of a bidirectional woven fiber fabric, in particular a woven carbon fiber fabric,
b) curing of the prepreg,
c) carbonization to form a C/C body, if desired followed by step e),
d) impregnation of the C/C body with carbonizable binders (pitches, resins or polymers), if desired followed by step c),
e) coating of at least one surface with a composition comprising carbonizable binders and short carbon fibers,
f) carbonization and infiltration with an Si melt.

To produce these friction bodies, carbon-containing porous green bodies are produced first (steps a to d).

Here, at least two layers of resin- or polymer-coated woven fiber fabrics or sheets, in particular ones made of carbon fibers, are laid on top of one another, pressed together and cured. Here, the methods of prepreg technology customary from CFP or CFC production are employed. It is important that in this step of the manufacturing process carbonizable binders are used for bonding the impregnated layers of woven fiber fabric to give a CFP body. In the lining of the bidirectional layers of woven fabric, it is advantageous to arrange the layers so that the fiber directions are at an angle to one another, resulting in, on average, a uniform (isotropic) fiber alignment over all layers. For example, two layers of woven fiber fabric in which the two directions of the fibers are at an angle of about 90° are arranged so that the fiber directions are offset by an angle of 45° between the layers. However, it is also possible to carry out shaping by other methods known from fiber composite technology, for example RTM (reaction transfer molding). In a further advantageous embodiment of the invention, the support structure provided for reinforcement is woven or knitted from fibers.

In the next step (c), the green body is carbonized, i.e. decomposed to nonvolatile carbon residues at temperatures above about 750° C. under nonoxidizing conditions. Preference is given to temperatures of at least 1600° C. These include temperatures above about 1800° C., where graphitization, i.e. crystallization of the carbon, additionally occurs.

In the next step (d), the CFC body is once more impregnated with carbonizable pitches, resins or polymers. This step essentially determines the amount of sacrificial carbon and the quality of the fiber protection and can, if appropriate, be repeated one or more times, with carbonization taking place between each renewed impregnation.

When the CFC body has been further impregnated, the precursor body of the friction layer or a corresponding friction layer composition is adhesively bonded or applied to it (step e). This layer is bound to the support or core zone by a predominantly (more than 50% of the mass) silicon-containing layer which acts like a hard solder.

The precursor body of the friction layer consists of a porous CFP or CFC layer, preferably starting from a pressable composition comprising short fiber bundles. The short fiber bundles usually comprise short fibers which have a mean length of preferably up to 30 mm and have been coated with carbon-containing material. The friction layer composition preferably consists of a formable adhesively bondable and carbonizable, spreadable composition comprising short fiber bundles.

For the purposes of the present invention, "formable" refers to a composition which can be shaped or formed under the action of pressure and heat.

The precursor body corresponding to the future friction layer or the friction layer composition have to have a carbon content matched to the desired future SiC content. The carbon which acts as reactant with the liquid silicon in the subsequent liquid siliconisation is derived from carbon-containing fillers, typically graphite, pyrolysis residues of resins and pitches and reactive short fiber bundles. Fibrous material can be completely omitted from the friction layer composition. In this way, a friction layer which is completely fiber-free after the siliconisation can be produced.

The shaped bodies provided with friction layer material are then silicized. On heating to the process temperature for the siliconisation, a carbonization again occurs. This carbonization can be carried out as a separate process step or together with the siliconisation.

The actual siliconisation is carried out at temperatures above 1420° C. by infiltration with a silicon melt which may contain up to 50% by mass of further metals or semimetals. In this step, at least part of the-carbon is converted by chemical reaction into SiC in a known manner. If further metals are used, mixed phases of silicon and the metals used and phases of metal carbides and/or metal silicides are formed in addition to Si and SiC phases. This means that the metals or semimetals of the matrix can be present as solutions in the Si or SiC, as Si alloy, as precipitates in the Si or SiC, as discrete Si compounds or as largely separate phases.

These metals or semimetals are typically introduced into the composite during liquid silicization as alloy constituents of the silicon and accumulate in the silicon phases of the material. Preferred metals include, in particular, Mo, Ni, Cr, Ti, Fe, Cu, Al and B.

The clutch disks produced using the composites of the invention withstand even the increased rates of rotation or rotational speeds without suffering failure. Even at rates of rotation which occur in the case of clutch disks of modern high-performance sports cars, no crack formation was evident.

What is claimed is:

1. A fiber-reinforced ceramic composite which comprises at least two layers of a multidirectional woven fiber fabric as reinforcement, with at least 5% of the area of each layer of woven fiber fabric being penetrated by matrix material.

2. A fiber-reinforced ceramic composite as claimed in claim 1, wherein the reinforcing fibers are carbon-containing fibers.

3. A fiber-reinforced ceramic composite as claimed in claim 1, wherein the reinforcing fibers have a mean length of at least 50 mm.

4. A fiber-reinforced ceramic composite as claimed in claim 1, wherein the matrix comprises phases of silicon carbide, metallic silicon and optionally carbon.

5. A method of use of fiber-reinforced ceramic composites as claimed in claim 1 comprising forming the composites into a support zone or core zone, and providing the composites with friction layers, to form clutch disks and brake disks.

6. A clutch disk for friction clutches of motor vehicles comprising a core zone comprising fiber-reinforced ceramic composites which comprises at least two layers of a multi-directional woven fabric and at least one SiC-rich friction layer, wherein the core zone has at least two layers of woven fiber fabric aligned as reinforcement parallel to the plane of the disk in a matrix comprising silicon carbide, carbon and silicon and the friction layer has a mass fraction of silicon carbide of from 30 to 99%, with at least 5% of the area of each layer of woven fabric being penetrated by matrix material.

7. A clutch disk as claimed in claim 6, wherein the mean length of the fibers or fiber bundles within individual layers of woven fiber fabric corresponds to at least 10% of the diameter of the clutch disk.

8. A clutch disk as claimed in claim 6, wherein the individual layers of woven fiber fabric are separated completely from one another by the matrix.

9. A clutch disk as claimed in claim 6, wherein the matrix has a mass fraction of at least 70% of silicon carbide.

10. A clutch disk as claimed in claim 6, wherein the friction layer has a mass fraction of from 20 to 60% of short carbon fibers having a mean length of not more than 30 mm.

11. A clutch disk as claimed in claim 6, wherein the friction layer is separated from the core zone by a layer comprising predominantly silicon.

12. A process for producing friction disks of fiber-reinforced composite ceramic comprising a core zone of ceramic reinforced by woven carbon fiber fabric and at least one SiC-rich friction layer, which comprises the following steps:

a) production of a prepreg comprising at least 2 layers of a bidirectional woven fiber fabric, b) curing of the prepreg, c) carbonization to form a C/C body, d) impregnation of the C/C body with a carbonizable substance selected from the group consisting of pitches, resins and polymers, e) coating of at least one surface of the of the body of step d) with a carbon-containing friction layer composition or adhesively bonding a friction layer precursor body onto at least one surface of the body of step d), and f) carbonization and infiltration of the coated body of step e) with an Si melt.

13. The process as claimed in claim 12, wherein the silicization forms coherent matrix regions whose maximum lateral dimension is 20% of the disk diameter within the layers of woven carbon fiber fabric.

14. The process as claimed in claim 12 or 13, wherein the matrix comprises silicon and optionally carbon together with a proportion by mass of at least 70% of silicon carbide.

15. The process as claimed in claim 12, wherein the carbonization is carried out at a temperature of at least 1600° C.

* * * * *